E. T. SILVIUS.
FILING APPLIANCE.
APPLICATION FILED FEB. 5, 1913.

1,141,422.

Patented June 1, 1915.
5 SHEETS—SHEET 3.

Witnesses
Geo. B. Pitts

Inventor
Ellis T. Silvius
By Edward R. Alexander
Attorney

THE NORRIS PETERS CO., PHOTO-LITHO., WASHINGTON, D. C.

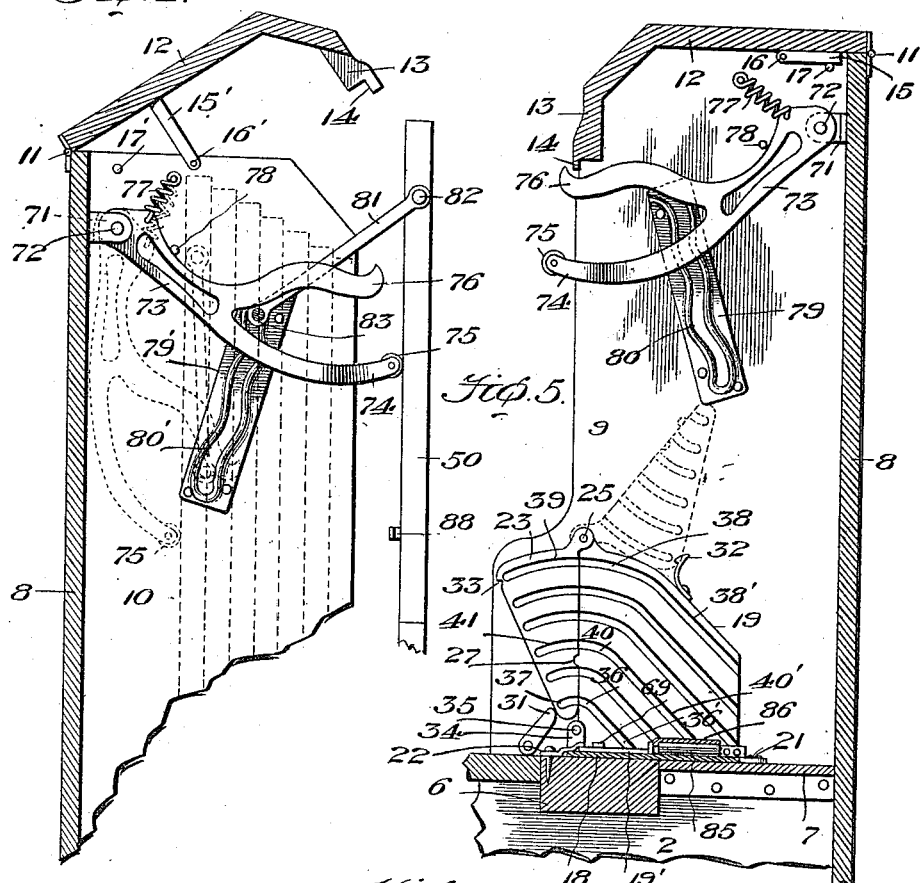

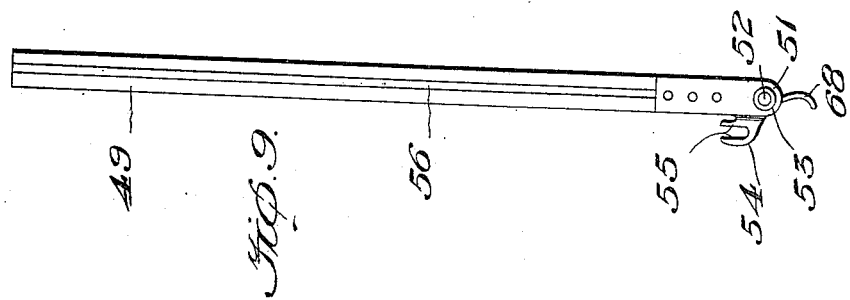
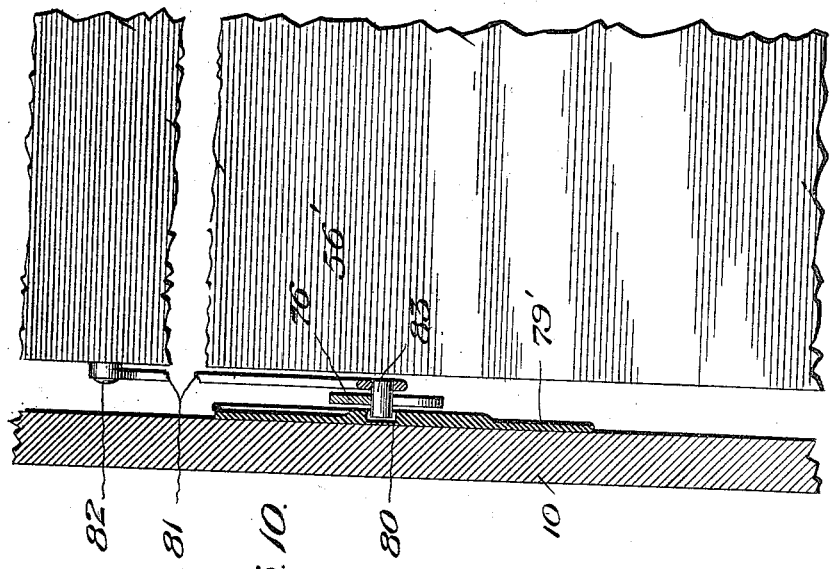

UNITED STATES PATENT OFFICE.

ELLIS T. SILVIUS, OF INDIANAPOLIS, INDIANA, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,141,422.     Specification of Letters Patent.     Patented June 1, 1915.

Original application filed May 4, 1909, Serial No. 493,923. Divided and this application filed February 5, 1913. Serial No. 746,301.

*To all whom it may concern:*

Be it known that I, ELLIS T. SILVIUS, a citizen of the United States, residing at Indianapolis, in the county of Marion and State of Indiana, have invented certain new and useful Improvements in and Relating to Filing Appliances, of which the following is a specification.

This invention relates to filing systems, and it has reference particularly to filing appliances or registers in which documents or records may be accurately, speedily and systematically filed, removed, or preserved for ready reference.

For the purpose of illustration, I have, in the accompanying drawings, shown and herein described one form of apparatus embodying my invention.

Figure 1:
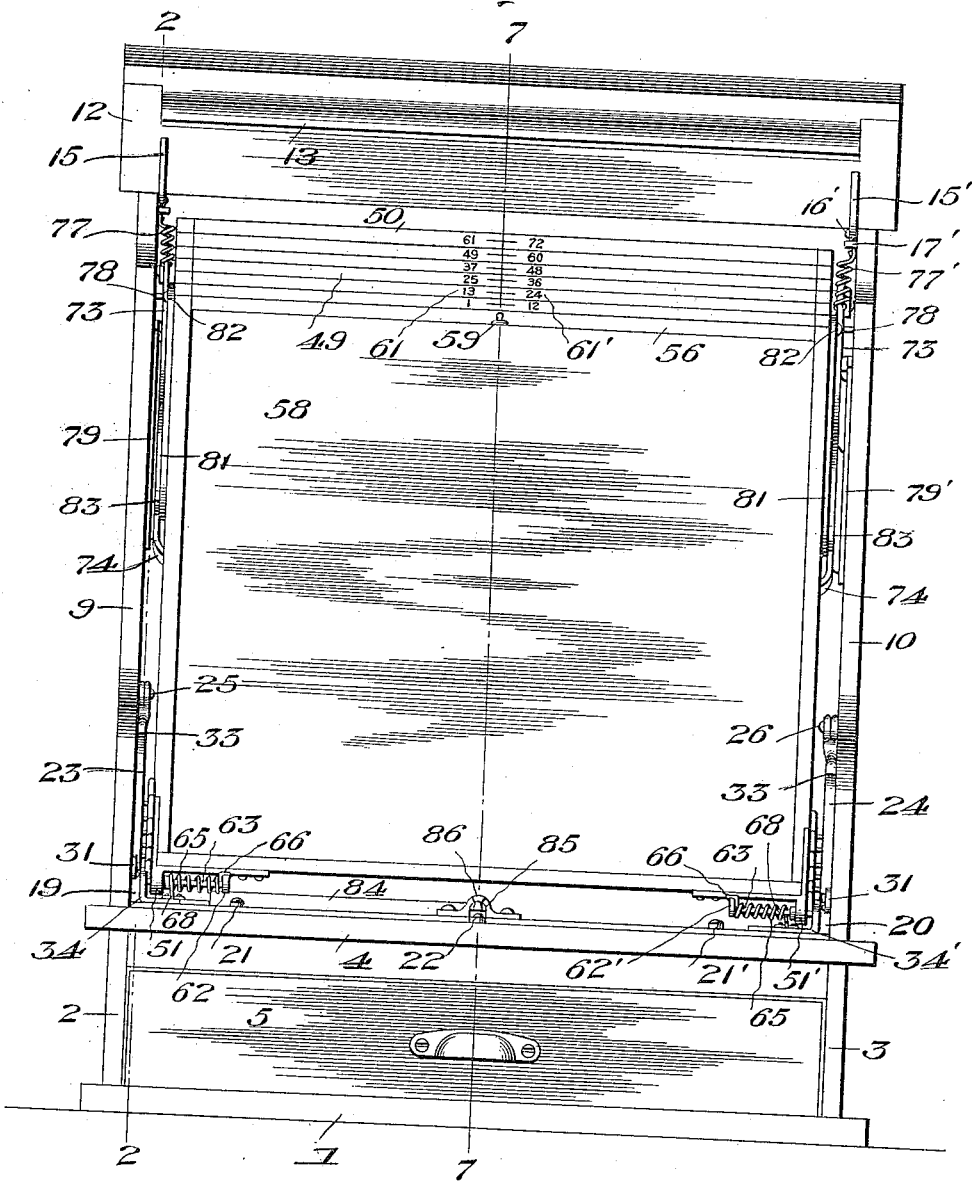
Figure 2:
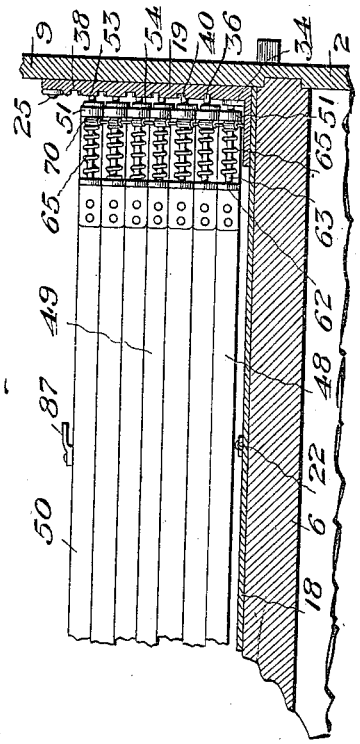
Figure 3:
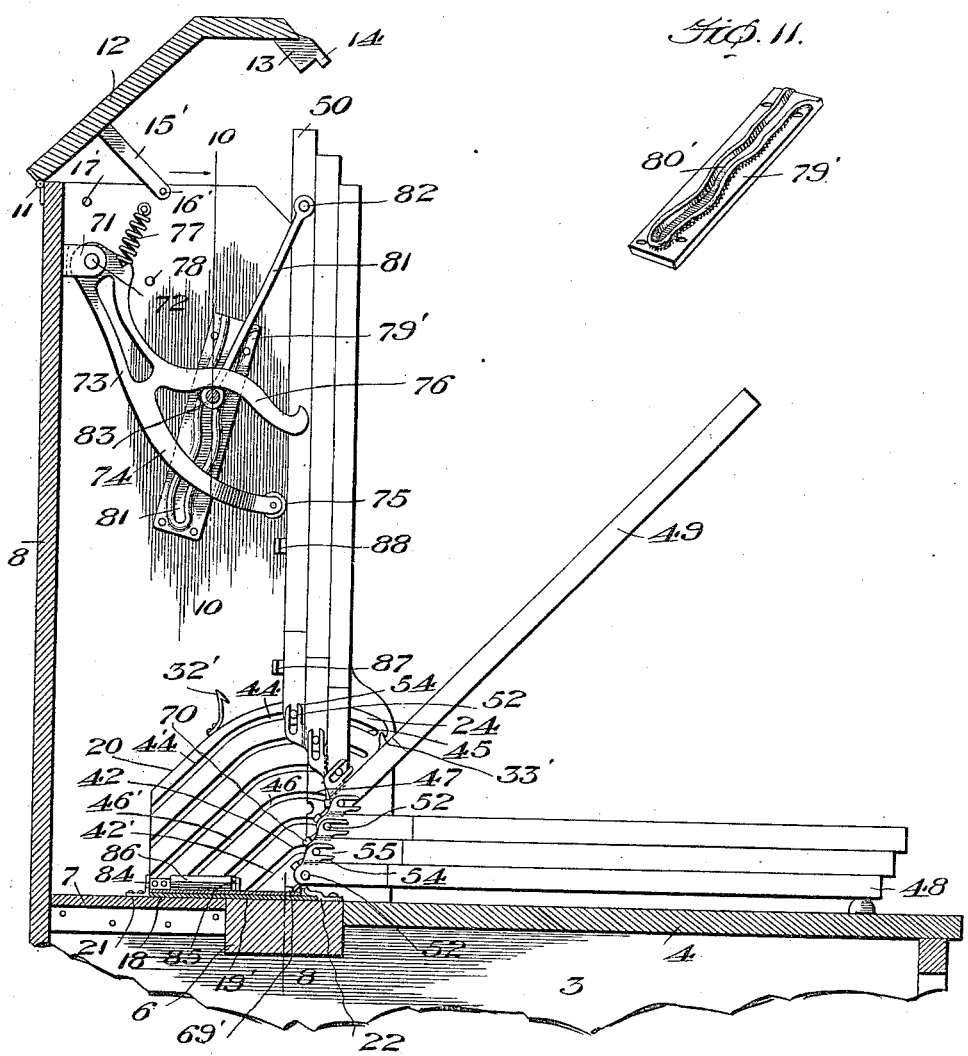
Figure 11:
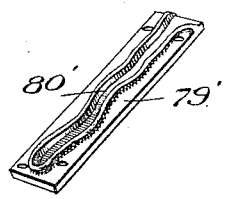
Figure 12:
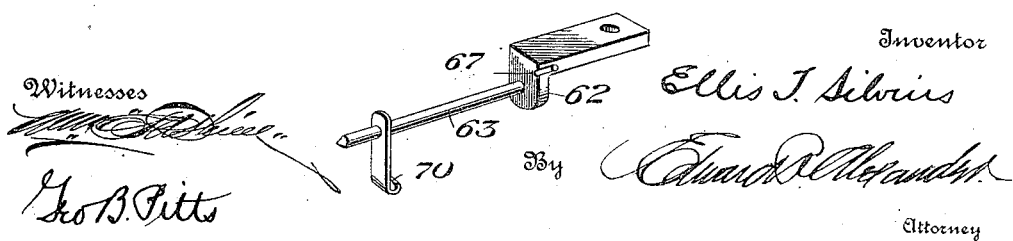

Figure 1 is a front elevation of a filing appliance embodying my invention. Fig. 2 is a longitudinal sectional view of the upper portion of the frames on the line 2—2 of Fig. 1. Fig. 3 is a side elevation of the frames, certain of the frames being one shown in prone position, one of the frames being shown partially operated and the remaining frames being drawn forward, the casing being shown in section and its lower portion broken away. Fig. 4 is a view similar to Fig. 2, showing the position of the parts when all the frames, except the rearmost one, are operated to prone position. Fig. 5 is a fragmentary sectional view through the casing on line 2—2 of Fig. 1 with the frames removed. Fig. 6 is a rear fragmentary view of the frames when in prone position. Fig. 7 is a longitudinal sectional view through certain of the frames in the position shown in Fig. 3 on the line 7—7 of Fig. 1. Fig. 8 is a fragmentary sectional view through the second frame from the front of Fig. 1 (looking from the rear) on a line indicated by the arrow 8—Fig. 3. Fig. 9 is a side elevation of one of the frames. Fig. 10 is a fragmentary view on the line 10—10 of Fig. 3. Fig. 11 and Fig. 12 are detail views.

Similar reference characters throughout the drawings indicate corresponding elements or features of construction referred to herein.

The invention comprises any suitable number of frames that may be desired for holding the documents or bill slips, and a suitable support for the frames preferably comprising a housing or cabinet to partially inclose the frames when in their normal upright positions and adapted to support the frames when drawn forward to reclining positions, the casing or housing being preferably adapted to be used as a writing desk. In the preferred construction the cabinet comprises a bottom 1, two sides 2 and 3, a desk top 4 on the top of the forward portions of the sides, and a drawer 5 in the forward portion of the desk part; a base member 6 extending between the sides 2 and 3 at the rear end of the desk top 4 and a floor 7 extending from the base member 6 rearward, the cabinet having a back 8 joined to the sides and extending upward a suitable distance above the rear ends of the sides. Two case sides 9 and 10 extend from the back forward a suitable distance to inclose the frames and support parts of the apparatus. The upper portion of the back 8 is provided with hinges 11 to which a cover 12 is attached that normally rests on the sides 9 and 10 and preferably has a downward extending front portion 13 having a downward extending lip 14 at the front thereof. Two props 15 and 15' are connected by pivots 16 and 16' to the sides 9 and 10, the props normally resting upon supports 17 and 17' that are attached to the sides and may be used for propping up the cover 12 when the register is in use. The member 6 comprises a part of the floor of the compartment for the bill holding frames formed by the back 8 and sides 9 and 10.

A base plate 18 normally rests horizontally on the member 6 and the floor 7, and it has two guide plate main parts 19 and 20 attached to the ends thereof or formed thereon, but preferably secured by flanges 19' and 20' formed on the guide plates and secured to the base plate. The base plate 18 is of rigid form, so as to support the guide plates 19 and 20 unyielding against the inner sides of the cabinet sides 9 and 10. One or more fingers 21 are secured to the floor plate 7 and securely hold the base plate 18 in its proper position at the rear end thereof, and a button 22 mounted on the member 6 secures the front end of the base plate firmly, but permitting the base plate to be withdrawn from under the fingers 21 and 21' for removal from the cabinet. The main part 19 of the guide plate has a supplemental part 23 to be used therewith, and the main part 20 has a supplemental guide plate part 24 to be used therewith, the supplemental parts being preferably connected to the main parts by hinge-pins 25 and 26 at their upper portions, so that the supplemental parts may swing up onto the tops of the main parts of the guide-plates. The supplemental parts are suitably designed, so as to be maintained in register or alinement with the main parts at their joint faces, preferably by means of projections 27 entering recesses 28. Locking devices 31, preferably cam shaped, are mounted on the inner sides of the cabinet sides 9 and 10 that engage the supplemental parts and lock them securely against the main parts of the guide-plates, and may be withdrawn to re-release the supplemental parts so that they may swing on their hinges. Latches 32 are mounted on the tops of the main parts 19 and 20 and are adapted to engage shoulders 33 formed on the fronts of the supplemental parts, when the supplemental parts are swung up onto the main parts. A pair of pivoting-stands 34 and 34' are securely mounted on the top of the base-plate 18 at the forward end thereof and adjacent to the insides of the guide-plates, each stand having a circular pivot bearing 35 therein. The guide-plates are provided with suitable guides at the inner sides thereof, and the guides preferably are formed as grooves in the inner faces of the plates, the main parts 19, 20, each having a curved groove from which continues a groove that is preferably straight and extends downward and rearward from the curved groove, the latter being planned as a segment of a circle struck from the center of the bearing 35, each supplemental part 23 having a curved groove 37 registering with the groove 36 and extending forward toward, but not entirely to the front edge of the supplemental part, the groove 37 being also a segment of a circle corresponding to the curvature of the groove 36, being concentric to the axis of the bearing 35. A suitable number of other grooves 40 are formed in the parts 19, 20, and grooves 41 are formed in the parts 23, all the curved grooves being concentrically arranged and the grooves extending therefrom being parallel one to another. All the grooves that extend downward and rearward from the curved grooves in the main parts of the guide plates are preferably, though not necessarily straight, and the guide grooves in either sectional guide-plate are opposite to the grooves in the opposite guide-plate and correspond therewith in contour.

A convenient number of bill holding frames or filing leaves are employed, there being a forward frame 48, a plurality of intermediate frames 49, and a rear frame 50, all having pivoting ends that are supported in the case or cabinet, so that the opposite or free ends may swing from upright to substantially horizontal positions. The pivoting end of each frame has two pivoting ears 51 and 51' thereon provided with pivots 52 and 52' for supporting the frames movably and permitting pivotal movements thereof, the forward frame 48, however, not being movable except pivotally, the pivots 52 and 52' thereof being mounted in the bearings of the pivoting stands 34 and 34'; and the pivots of the other frames are mounted in the guide-grooves that are formed in the pair of sectional guide-plates 19 and 20, the pivots of the frame next adjacent to the forward frame 48 being mounted movably in the guide-grooves next above and rearward of the axis of the pivots of the forward frame, each other frame having one pivot similarly mounted in a guide-groove of the companion guide-plate, so that all the frames when upright may be close together, and when drawn forward will rest one upon another and the forward leaf supported by the top 4 of the desk part. The pivots of all the intermediate frames and the rear frame are preferably each provided with a roller 53 to permit of easy movement of the pivots in the guide grooves. Each frame except the rear frame 50 is provided with the two rearward extending arms 54 in which are guide-ways 55, the guideways extending longitudinally in planes rearward of the frames. The guideways receive the pivots of the adjacent frames next rearward in arrangement, so that when either one of the frames, except the rear frame, is moved forward it will draw the remaining frames forward, and also when moved forward pivotally will draw the remaining upright frames forward. When all the frames are drawn forward to reclining positions their pivots will be stopped by the ends of the guide-grooves in the supplemental parts of the guide-plates, and when all the frames stand upright they will be maintained in the desired positions, partly by the guide-grooves and partly by the arms 54 of the forward frames, the relative arrangement of the frames preferably being such that the axes of their pivots collectively will be in an inclined plane, and therefore, the rearward leaves will extend higher than the tops of the forward leaves progressively with the result that the front face at the top of each frame is exposed to view. Each bill holding frame, except the rear one, comprises a plate 65 that is arranged midway between the forward and rear sides of the frame, the rear frame 50 having a plate 56' arranged at the rear side of the frame. The forward frame 48 has suitable guide-grooves therein retaining a plate 58 provided with a fingerhold 59 for withdrawing the plate from the frame. The plate 58 may be used for various purposes, such as holding a record sheet or index sheet on the inner side thereof. The free end of the frame 48 may be engaged by the lip 14 with which the cover 12 is provided and obviously the cover may be suitably locked, if desired, to prevent operation of the frames by unauthorized persons. The inner side of the plate 56 of the forward frame 48 has bill-clips 60 thereon, similar bill-clips being mounted on both front and rear sides of the plates of the intermediate frames, and on the forward or inner side of the plate 56', the terms forward and rearward being understood as having reference to the frames when in normal upright positions. The upper forward portion of the frames, except the forward one, have index characters, as 61 and 61' thereon all clearly exposed to view, and of sufficiently large size to be easily read hurriedly by the attendant at the front of the cabinet.

The supported end of each bill holding frame has a pair of projections 62 and 62' thereon preferably formed separately and attached to the frames and arranged opposite to the pivoting ears of the frame, the projections having guide-rods 62 thereon extending to and entering a socket 64 in the opposite pivoting ear, each frame having a guide-rod at each side thereof, and balancing springs 65 are mounted on the guide-rods, there being a spring between each pivoting ear and a projection 62, so that each bill holding frame is provided with two balancing springs, the balancing springs having arms 66 engaging the projections preferably in recesses 67 in the forward sides of the projections, there being an arm on one end of each spring, and the opposite ends of the springs having arms 68 thereon for preventing rotation of the springs on their guide-rods. The arms 68 of the springs that are provided for the forward frame 48 engage clips 69 that are secured to the base-plate 18, and the corresponding arms of the springs with which the remaining frames are provided engage stirrups 70 that are hung on the guide-rods of all of the frames except the rear frame, the stirrups being adjacent to the inner side of the pivoting ears of the frames, the arrangement of the anchoring arms of the springs being such that the arms of the springs on the rearward frames extend to and engage the stirrups that are on the guide-rods of the next adjacent forward frames. It is designed that the balancing springs shall have only sufficient tension to hold the frames in upright positions and permit them to lie horizontally when loaded with documents or papers, and obviously the tension of the springs for some of the frames may be greater or less than the tension required for other frames, and it is obvious that each frame may be provided with only one spring if so desired, and that the tension of either spring may be changed if desired to a greater or less degree, and if broken may be readily replaced with a new one by first detaching the projection 62 from the frame.

In order to maintain the frames in substantially vertical positions improved paralleling apparatus is provided. This apparatus preferably comprises a pair of pivoting blocks 71 and 71' that are mounted on the upper rear portion of the case or cabinet and have pivots 72 that may be arranged in proximity to the back 8 and the sides 9 and 10, an arm 73 being mounted on each pivot and provided with a branch 74 carrying a roller 75 engaging the rear side of the rear frame 50. Each arm may also be provided with a branch 76 extending between the sides of the frames and the adjacent side 9 or 10 of the case or cabinet. Springs 77 and 77' are preferably employed and supported by the sides 9 and 10 and are connected to the arms 73 to hold them against stops 78, attached to the sides 9 and 10, when the frames are removed from the case or cabinet. A pair of guide-plates 79 and 79' are preferably attached to the inner sides of the sides 9 and 10 respectively and have suitable guides thereon formed preferably as grooves 80 in the inner sides thereof. A pair of stiff links 81 are connected by pivots 82 to opposite sides of the frame 50, the links having guide-pins 83 on the free ends thereof that engage the under sides of the branches 76 and extend into the grooves 80. The guide slots 80 are preferably formed of a series of substantially straight and curved portions so arranged that the pins 83 will traverse a path corresponding to the path or movement of the pivot pin for the rearmost leaf as it is moved forwardly and upwardly upon the operation of each of the forward leaves successively. The effect of this arrangement of the slots 80 in coöperation with the links 81 and arms 73 is to maintain the rearmost leaf and all those leaves which remain upright in predetermined position as they are moved forwardly by the operation of the front or succeeding leaves. The under sides of the branches 76 are suitably curved to coöperate with the links 83 and the guide-grooves 80, the contours thereof being designed in accordance with the positions of the guide-plates with respect to other parts of the apparatus, all being preferably arranged approximately as shown with the guide-grooves extending in up and down directions. The rear frame 50 is preferably normally held against the rollers 75 by the balancing springs of the frame, and when the frame moves either upward or in the inclined guides, or forward it will cause the arms 73 to move upward pivotally, so that the rollers 75 will swing forward and thus move the upper portion of the frame to the same extent as the lower end of the frame may be moved forward and, of course, the reverse will occur with rearward and downward movement of the frame. When the frame is moving rearward its balancing springs will push the arms, comprising the abutments, downward and rearward and the different positions of the abutments will be controlled by the rear frame through the means of the links 81 and the guides and guide-pins and the branches 76 hereinbefore described. It will be clear, therefore, that when the rear frame 50 is stationary in upright position the remaining frames will be stopped thereby or guided in perpendicular arrangement, and that in the various adjusted positions the frames will always stand precisely in parallel vertical planes. When it is desired to move the frames from the cabinet the guide-pins 83 will be withdrawn from the guide-grooves 80 and the links 81 will hang at the sides of the rear frame.

In order to conveniently hold the group of frames together in positions perpendicular to the base-plate 18 when removed from the case or cabinet, a locking-bar 84 is provided that has a journal 85 extending at right angles thereto, and the journal is mounted on the base-plate 18 by means of a housing 86, so that the locking-bar may lie on the base-plate or swing up to a position at right angles thereto. The rear frame 50 is preferably provided with two lock-plates 87 and 88 adapted to be engaged by the locking-bar when the latter is swung up against the rear sides of the frame whereby the frame is prevented from moving pivotally, and the other frames, as will be understood, are pushed toward the rear frame and stopped thereby as a result of the action of their balancing springs.

In the drawings the frames are represented as being horizontal when drawn forward to reclining positions and it is preferable that they be so arranged, but it is obvious that their mountings may be slightly modified so that they may rest in slightly inclined positions, if desired, and also it may be designed that the frames when upright may be slightly inclined if so desired.

In practical use the frames will normally stand substantially as shown in Figs. 1 and 2, and when it is desired to operate the frames the cover 12 will be propped up, so that the indexing of the frames may be clearly seen and the frames be permitted to be drawn forward as illustrated in Figs. 3 and 4. The bill slips or other papers will be suitably held on the frames as by means of the clips 60, so that when one or more of the frames are drawn down the remaining frames will be drawn forward equal distances at their tops and bottoms and the papers on the front of the foremost frame conveniently accessible, while the papers on the top of the uppermost reclining frame will also be accessible to the attendant.

It will be noticed that the supported ends of the frames are rounded, and that when either frame is in horizontal position the next adjacent frame if in upright position will be in contact with the under frame, so that if the under frame be moved upward pivotally it will by reason of the contact assist in starting the upper frame to move rearward on its guides while the balancing springs of the upper leaf will assist also in pushing it up during the initial movements of the upper frame, the upward movement being continued by means of the connecting arms of the lower frame engaging the pivots of the upper frame slidingly. The actions of the paralleling apparatus including the adjustable abutments it is thought will be clearly understood from the foregoing description thereof and with reference to the drawings showing the apparatus in different positions and in broken lines. When it is desired to remove the frames to a place of safety, as may be desired at the close of business hours, the button 22 may be turned to release the base-plate 18 after which the base-plate containing the guide-plates and supporting the frames may be removed from the cabinet and then the supplemental parts of the guide-plates may be swung up and latched on the tops of the main parts of the guide-plates at the sides of the frames, and the locking-bar 84 may be swung up into engagement with the locking-plates 87 and 88 and the back of the rear frame 50 so that the frames will be held upright, and have a horizontal supporting base on which to stand, the whole group and supports thereof occupying but little more space than the frames alone.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:—

1. The combination of a casing, a series of leaves operatively mounted in the casing, connections between the leaves permitting them to swing relatively to each other with a concomitant movement toward and from the foremost leaf, a member pivoted to said casing behind the leaves, and means actuated by the movement of the rearmost leaf engaging said member for holding said leaf in upright position.

2. The combination of a casing, a series of leaves operatively mounted in the casing, connections between the leaves permitting them to swing relatively to each other with a concomitant movement toward and from the foremost leaf, a member pivoted to said casing behind the leaves, a spring normally tending to swing the lower end of said member forward, and means actuated by the movement of the rearmost leaf engaging said member for holding said leaf in upright position.

3. The combination of a casing, a series of frames, connections between the frames permitting them to swing relatively to each other, means for pivotally supporting the foremost frame, an abutment pivoted in the casing and arranged to engage the rearmost frame, a device carried by the rearmost frame for actuating said abutment, and means for controlling the operation of said device.

4. The combination of a case, a series of frames arranged to be assembled face to face normally in upright position, means including connections between the frames for supporting said frames and permitting them to swing relatively to each other, an abutment pivoted in said case and arranged to engage the rearmost frame, a device carried by the rearmost frame having operative connection with said abutment and provided with a pin, and a guide device for said pin carried by the case for controlling the operation of said pin.

5. The combination of a casing, a series of frames, connections between the frames permitting them to swing relatively to each other, means for pivotally supporting the foremost frame, an abutment movably mounted in the casing and arranged to engage the rearmost frame, and means actuated by the rearmost frame for operating said abutment to maintain the rearmost frame upright and to move it forward.

6. The combination of a case, a plurality of normally upright frames, connections between the frames permitting them to swing relatively to each other, a guide plate secured to the case and having a guide groove therein, an arm pivoted to the case and having two branches, one branch having a roller thereon that engages the rear side of the rearmost one of the frames and the other one of the branches extending opposite the guide plate that is secured to the case, and a link pivoted to the rearmost one of the frames and having a guide pin thereon that engages said last mentioned branch and extends through the said guide groove last described.

7. The combination of a casing, a series of leaves, pivotal connections between the leaves permitting said leaves to swing relatively to each other, means for pivotally supporting the front end leaf of the series of leaves in the casing, a member pivoted to said casing and arranged to depend downwardly behind said leaves, a spring normally tending to swing the lower end of said member outwardly, the said member operating to move the rear end leaf forwardly and permitting said leaf to move vertically relative to said member during its forward and rearward movement, and anti-friction means interposed between said member and the rear end leaf.

8. The combination of a casing, a series of leaves, pivotal connections between the leaves permitting said leaves to swing relatively to each other, means for pivotally supporting the front end of the series of leaves in the casing, a member pivoted to said casing and arranged to depend downwardly behind said leaves, and a spring connected at one end to said member and fixed at its opposite end to the casing forward of the pivot for said member and normally tending to swing the lower end of said member forwardly toward the pivot for the front end leaf, the said member operating to move the rear end leaf forwardly and permitting said leaf to move vertically relative to said member during its forward and rearward movement.

9. In a filing appliance, the combination of supporting means, a series of leaves mounted thereon and having connections between them operating, when one or more of the leaves are reclined, to move the remaining leaves forwardly, and a pair of coöperating links, one carried by the rearmost leaf and the other by the leaf supporting means, and the one link having sliding engagement with the supporting means and the other link for controlling the movement of the rearmost leaf.

10. In a filing appliance, the combination of supporting means, a series of leaves mounted thereon and having connections between them operating, when one or more of the leaves are reclined, to move the remaining leaves forwardly, a pair of coöperating links, one carried by the rearmost leaf and the other by the leaf supporting means, and one of said links having an arm engaging with the said leaf for controlling the movement of the rearmost leaf.

11. In a filing appliance, the combination of supporting means, a series of leaves mounted thereon and having connections between them, operating, when one or more of the leaves are reclined, to move the remaining leaves forwardly, a pair of coöperating links, one carried by the rearmost leaf and the other by the leaf supporting means, for controlling the movement of the rearmost leaf, and guide means for one of said links.

12. In a filing appliance, the combination of a series of leaves having connections between them operating, when one or more of the leaves are reclined, to move the remaining leaves forwardly, and a pair of links having sliding engagement with each other and controlled by the rearmost leaf of the series for maintaining said rearmost leaf upright as it moves forwardly.

13. In a filing appliance, the combination of supporting means, a series of leaves mounted thereon, means connecting the leaves together and operating, when one or more of the leaves are reclined, to move the remaining leaves forwardly, a link pivotally connected to one of the leaves, an abutment pivotally supported by the leaf supporting means and arranged to be operated by the said link, and a guide corresponding in shape to the path traversed by the lower end of the leaf to which the said link is attached for controlling the movement of the abutment and maintaining the said leaf upright during its forward movement.

14. In a filing appliance, the combination of supporting means, a series of leaves mounted thereon, means connecting the leaves together and operating, when one or more of the leaves are reclined, to move the remaining leaves forwardly, an abutment pivotally supported by the leaf supporting means and arranged to engage with the rearmost leaf of the series, and means carried by the rearmost leaf for controlling the operation of the abutment to maintain the rearmost leaf upright during its forward movement.

15. In a filing appliance, the combination of supporting means, a series of leaves mounted thereon, means connecting the leaves together and operating, when one or more of the leaves are reclined, to move the remaining leaves forwardly, an abutment pivotally supported by the leaf supporting means and arranged to engage with the rearmost leaf of the series, and means actuated by the rearmost leaf for controlling the operation of the abutment and maintaining the rearmost leaf upright during its forward movement.

16. In a filing appliance, the combination of a series of leaves having connections between them operating, when one or more of the leaves are reclined, to move the lower end of the remaining leaves forwardly, a link pivotally connected to one of the leaves, and a movable abutment having a pair of arms, one of which engages with the rearmost leaf of the series and the other arm arranged for engagement with the said link, whereby the movement of the link controls the operation of the abutment.

17. In a filing appliance, the combination of a series of leaves having connections between them operating, when one or more of the leaves are reclined, to move the lower ends of the remaining leaves forwardly, a link pivotally connected to one of the leaves, a movable abutment having a pair of arms, one of which engages with the rearmost leaf of the series and the other arm arranged for engagement with the said link, whereby the movement of the link controls the operation of the abutment, and guide means for the said link.

18. In a filing appliance, the combination of a series of leaves having connections between them operating, when one or more of the leaves are reclined, to move the lower ends of the remaining leaves forwardly, a link pivotally connected to one of the leaves, a movable abutment having a pair of arms, one of which engages with the rearmost leaf of the series and the other arm arranged for engagement with the said link, whereby the movements of the link controls the operation of the abutment, and a spring operating to move the said abutment into engagement with the rearmost leaf.

19. In a filing appliance, the combination of a series of leaves, connections between the leaves permitting them to swing relatively to each other and to move toward and from the foremost leaf, a movable abutment, means for pressing the abutment against the rearmost leaf, means for pressing the rearmost leaf in opposition to said abutment and coöperating therewith to control the rearmost leaf in its forward and rearward movements.

20. In a filing appliance, the combination of a support, a series of leaves mounted on said support at one end, connections between said leaves permitting them to swing relative to each other and operating, when one or more of said leaves are reclined, to move the lower edges of the remaining leaves toward the supported end leaf, a link pivotally connected at one end to the unsupported end leaf of the series and pivotally and slidably supported at its opposite end by said support, and arranged to be operated by the unsupported leaf when one or more of the remaining leaves are reclined, and means controlled by said link for guiding the said unsupported end leaf.

In testimony whereof I affix my signature, in the presence of two witnesses.

ELLIS T. SILVIUS.

Witnesses:
J. H. GARDNER,
M. L. WILHELM.